T. E. MURRAY.
ELECTRICAL WELDING.
APPLICATION FILED JUNE 28, 1916.

1,196,473.  Patented Aug. 29, 1916.

Inventor
Thomas E. Murray
By his Attorney

UNITED STATES PATENT OFFICE.

THOMAS E. MURRAY, OF NEW YORK, N. Y.

ELECTRICAL WELDING.

1,196,473.  Specification of Letters Patent.  Patented Aug. 29, 1916.

Original application filed February 18, 1916, Serial No. 79,050. Divided and this application filed June 28, 1916. Serial No. 106,319.

*To all whom it may concern:*

Be it known that I, THOMAS E. MURRAY, a citizen of the United States, residing at New York, in the county of New York and State of New York, have invented a certain new and useful Improvement in Electrical Welding, of which the following is a specification.

The invention relates to electrical welding, and consists in the method hereinafter set forth, of butt-welding a tube to a plate, whereby an extra amount of metal is provided for fusion at the joint, thus avoiding the melting of either the tube or the plate.

The invention is more particularly applicable to metal vehicle wheels having hollow spokes, in which there is, of course, a predetermined definite length of spoke between the hub and the rim. If the spoke be made originally at this predetermined length, it is obvious that the welding operation at the outer end of the spoke causes a fusion of the metal either at the extremity of the spoke or at the plate or rim to which that end may be joined—with the result that the joint is of necessity weakened. By my method, depending upon the production of a circular rib of additional metal upon the face of the plate or rim, ample metal is provided for fusion, and none of it need be taken from either spoke or rim—with the consequence that a stronger and better joint is produced.

This application is a division of my application for metal vehicle wheels, Serial No. 79,050, filed February 18, 1916.

Figure 1:
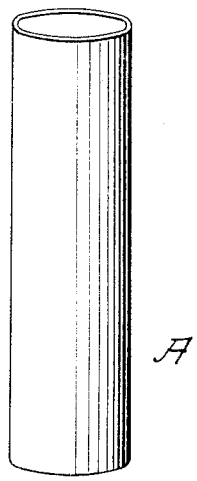
Figure 3:
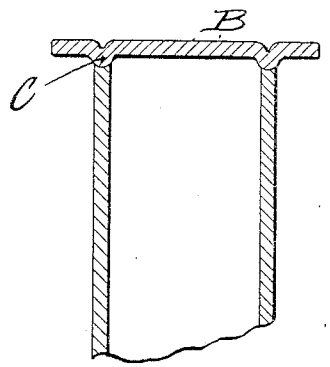
Figure 2:
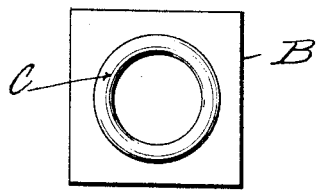
Figure 4:
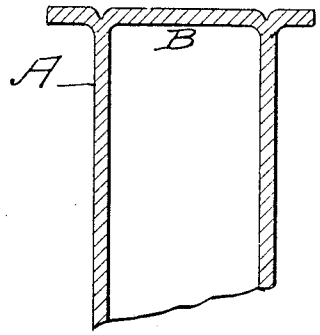

In the accompanying drawings Figure 1 is a perspective view of a tubular spoke of thin metal. Fig. 2 is a plan view of a plate, to which one end of the spoke is to be welded, and which may form a flange on said spoke. Fig. 3 is a longitudinal section of spoke and plate, with the end of the spoke in contact with the circular rib on the plate before welding. Fig. 4 is a similar section after the welding between spoke and plate is completed.

Similar letters of reference indicate like parts.

A is a tubular spoke, or any other tube of thin metal.

B is a plate, to which the extremity of the tube A is to be welded. To this end, I form upon the surface of plate B a circular rib C of the metal of the plate, and place the end of tube A in butt contact with said rib, as shown in Fig. 3. Upon the passage of the welding current, the rib C becomes fused, and homogeneously unites the tubular spoke A and plate B. I may weld the plate B directly to the under side of the rim of a metal vehicle wheel, or I may form the rib C directly upon said rim. The object of the rib C is either case is to provide sufficient metal to form the welded joint, and thus to avoid taking the same from either the plate B or the tubular spoke A.

I claim:

The method of butt-welding a tube to a plate, which consists in forming on said plate a circular rib registering with the extremity of said tube, placing the end of said tube in contact with said rib, and causing a welding current to pass through the joint, whereby said rib is melted to provide metal for uniting said tube and said plate.

In testimony whereof I have affixed my signature in presence of two witnesses.

THOMAS E. MURRAY.

Witnesses:
GERTRUDE T. PORTER,
MAY T. MCGARRY.